No. 680,263. Patented Aug. 13, 1901.
C. D. MADDUX.
LID OR PLATE LIFTER.
(Application filed Oct. 27, 1900.)
(No Model.)

Witnesses
T. P. Britt
Clarence Shaw

Inventor
C. D. Maddux,
by O'Meara
Attorneys

UNITED STATES PATENT OFFICE.

CHARLES D. MADDUX, OF MOBEETIE, TEXAS.

LID OR PLATE LIFTER.

SPECIFICATION forming part of Letters Patent No. 680,263, dated August 13, 1901.

Application filed October 27, 1900. Serial No. 34,629. (No model.)

*To all whom it may concern:*

Be it known that I, CHARLES D. MADDUX, a citizen of the United States, residing at Mobeetie, in the county of Wheeler and State of Texas, have invented a new and useful Lid or Plate Lifter, of which the following is a specification.

This invention relates to improvements in lifting devices; and the object is to provide a simple and improved device for lifting or removing lids from vessels or for conveniently lifting the vessels to move the same from place to place, the device being exceedingly simple in construction and effective in operation.

With the above object in view the invention consists in the novel features of construction hereinafter fully described, particularly pointed out in the claim, and clearly illustrated by the accompanying drawings, in which—

Figure 1:
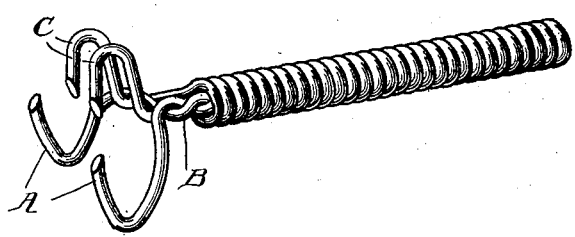
Figure 2:
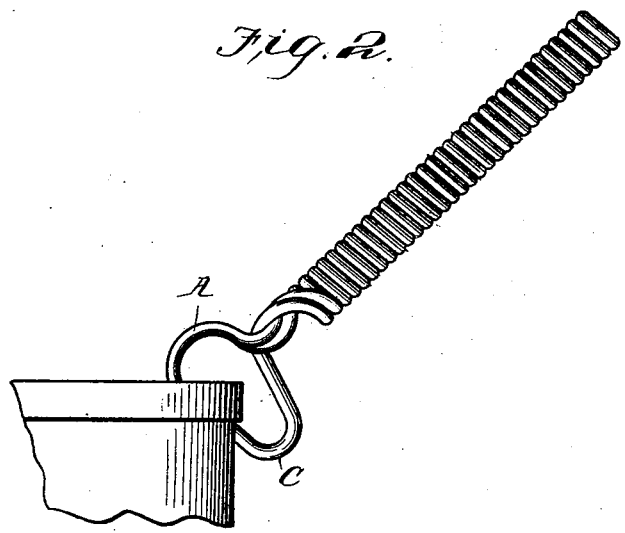
Figure 3:
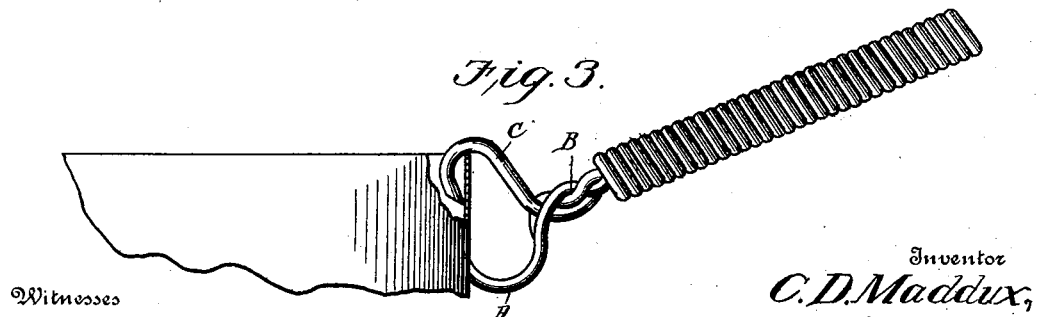

Figure 1 is a perspective view of my improved lifter; Fig. 2, a view of the same, showing its operation in removing the lid from a vessel; and Fig. 3, a view showing the invention used as a lifting device for vessels.

My invention as here illustrated is formed of a single piece of wire of suitable diameter, the same being bent to form a pair of parallel hooks A, having their ends beveled. The wire is then twisted to form a longitudinally-extending core or stem B. After forming said core or stem the wire is twisted about the same until the hooks A at the forward end thereof are reached, when the ends of the wire are bent to form a pair of parallel hooks C, having beveled ends, said hooks C being formed reversely of hooks A and placed closer together than said hooks A and are of smaller size. Thus a device is provided consisting of a handle portion having at one end four claws or hooks the points or ends of which extend toward each other.

In using the device to remove the lid of a vessel the larger hooks are placed on top of the bucket, with the smaller hooks beneath the lid. The device is then drawn upwardly, readily and conveniently removing said lid.

To use the same as a lifter for plates or vessels, the smaller hooks are placed in engagement with the upper edge or rim, while the larger hooks bear against the exterior of the vessel. The vessel may be then conveniently lifted and carried from place to place by my improved device.

Having thus fully described my invention, what I claim as new, and desire to secure by Letters Patent of the United States, is—

A device of the character described, formed of a single piece of wire twisted to form a handle portion having at one end thereof two pairs of oppositely-disposed hooks having their points or ends facing each other, the hooks of each pair being spaced, the hooks of one pair being farther apart than those of the other pair and having their points disposed in a plane in advance of the points of the hooks of said other pair, substantially as described.

CHARLES D. MADDUX.

Witnesses:
W. H. ELLIS,
J. M. BALDWIN.